INVENTORS
GIOVANNI DI DRUSCO
FRANCO PACE

United States Patent Office 3,506,634
Patented Apr. 14, 1970

3,506,634
METHOD OF REMOVING THE REACTION HEAT DURING COPOLYMERIZATION REACTIONS AND SIMULTANEOUSLY CONTROLLING THE COMPOSITION OF THE COPOLYMER PRODUCED AT A PREDETERMINED, CONSTANT VALUE
Giovanni Di Drusco, Bologna, and Franco Pace, Ferrara, Italy, assignors to Montecatini Edison S.p.A., Milan, Italy
Continuation of application Ser. No. 332,309, Dec. 20, 1963, which is a continuation-in-part of application Ser. No. 829,418, July 24, 1959. This application Aug. 26, 1966, Ser. No. 575,471
Claims priority, application Italy, July 31, 1958, 11,681/58
Int. Cl. C08f 1/06, 1/08, 15/04
U.S. Cl. 260—88.2        2 Claims

ABSTRACT OF THE DISCLOSURE

There is disclosed a method for copolymerizing ethylene and a higher alpha-olefin under constant temperature and pressure conditions, in the absence of an inert polymerization solvent, in which the reaction heat is removed and, simultaneously, the composition of the copolymer produced is controlled at a predetermined constant value by continuously feeding at least the ethylene into a reaction zone containing a liquid phase in equilibrium with a gaseous phase essentially consisting of ethylene and the higher alpha-olefin, the gaseous phase is continuously sucked from the reaction zone, at a rate selected to main the pressure in said zone constant, said gaseous phase is compressed and liquified, the liquified gases are cooled and expanded isoenthalpically to the pressure in the reaction zone; and the liquified gases are recycled to the reaction zone, at least the ethylene being fed into the copolymerization reaction zone at a rate selected to maintain the temperature in said zone constant.

---

Figure 1:
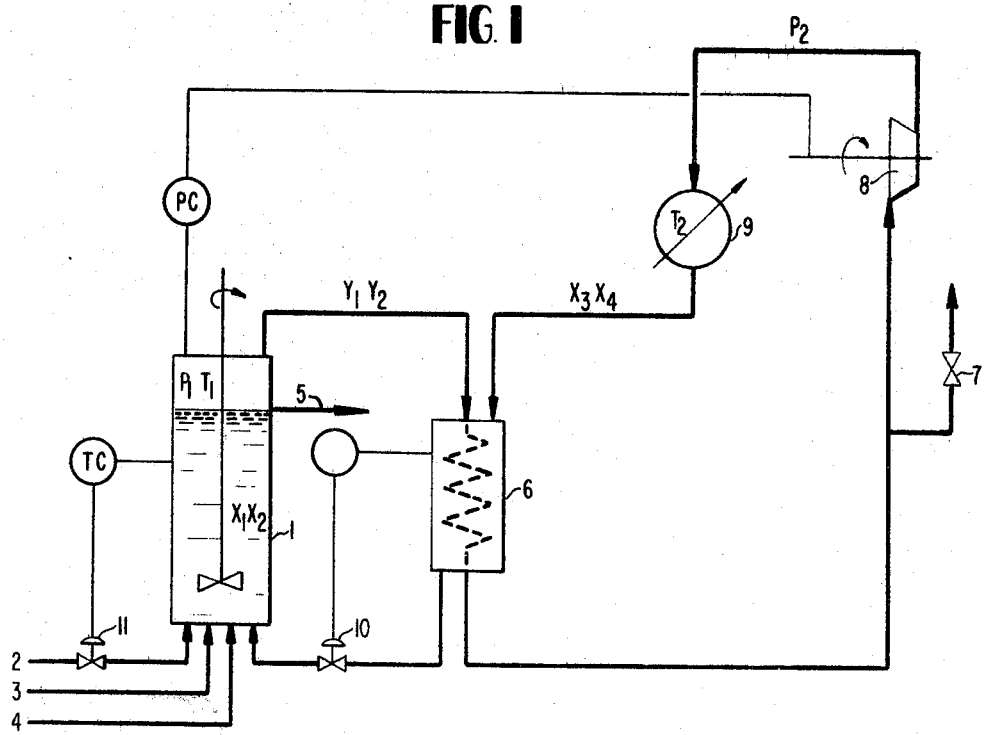

This application is a continuation of application Ser. No. 332,309, filed Dec. 20, 1963, which in turn is a continuation-in-part of application Ser. No. 829,418, filed July 24, 1959, both of which are now abandoned.

In the production of copolymers of olefins, several processes have been disclosed wherein the reaction is accomplished at low pressure and in the presence of catalysts obtained by reacting organo-metallic compounds with transition metal compounds.

For example, a process has been disclosed for preparing alpha-olefin copolymers and more particularly copolymers of alpha-olefins with ethylene wherein the monomers are reacted in the complete absence of a solvent, at a very low temperature, e.g. −100° C., under conditions such that the monomeric mixture in the polymerization autoclave is in the liquid phase. This reaction is accomplished in the presence of catalysts obtained from alkyl derivatives of metals belonging to the 1st, 2nd, and 3rd group of the Periodic Table and from liquid compounds of transition metals belonging to the 4th, 5th, or 6th group of Mendeleeff's Periodic Table. In this process, however, high reaction rates and high heat values due to the reaction are observed; moreover in order to obtain homogeneous-end products having consistent properties, it is necessary to keep the ratio of the reacting monomers constant and to maintain the contents of the reaction vessel in a homogeneously constant state. The experience has shown, in fact, that even minor variations, e.g. in the order of 1%, of the composition of the liquid reacting phase, cause a great difference in the composition and the physical characteristics of the final products. It is because of the high reaction rate, the heat of reaction, and the criticality of the reacting composition that unusually difficult control problems are encountered.

One of the important problems is the heat of the reaction where if the heat were to be removed by conventional heat-exchange apparatus, an aggregation of complicated and expensive equipment would be required and in some cases would still not accomplish the objective of continuous and complete heat removal. Another, and more critical problem is keeping the ratio of the reactants exactly constant. Moreover when, as in this case, the reaction is to be carried out at a low temperature, at or below 0° C. and same reaction is highly exothermic, it is necessary to start said reaction at such a low temperature and to keep said low temperature during the whole reaction by cooling the reaction vessel with the frigorific units provided for by an outer, expensive frigorific source.

Accordingly, to overcome these problems, it is an object of this invention to provide a system and a process for the control of copolymerization reactions wherein the heat of reaction is removed easily in simple equipment and the ratio of monomers is held constant, while at the same time the reaction vessel is kept at the low temperature required by said reaction without resorting to an outer, expensive frigorific source.

It is an object of this invention to provide a process which produces completely homogeneous copolymers.

It is still another object to provide the apparatus for control of copolymerization reactions wherein the heat of reactions is removed easily in simple equipment and the ratio of monomers is held constant. Said apparatus provides also for the frigorific units required to keep the reaction vessel at the desired low temperature.

Other objects and advantages of this invention will become apparent upon a further study of the accompanying drawings.

Figure 2:
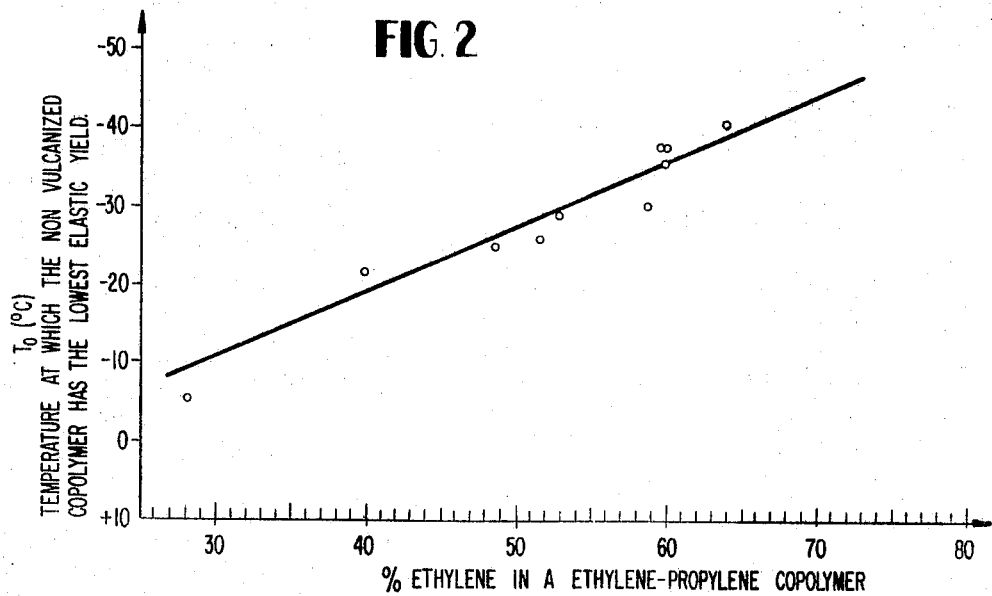

FIGURE 1 is a schematic representation of a specific embodiment of the process of this invention, and FIGURE 2 is a graph which demonstrates the relationship between the composition of the ethylene-propylene copolymer and its elastomeric properties.

These objects are obtained by means of an external heat-exchange cycle including an isoenthalpic expansion. The process according to this invention is characterized in that the vapors of the monomers in the reactor are drawn from the reactor, heated, compressed, condensed, isoenthalpically expanded and then recycled back to the liquid side of the reactor. The esssentially liquid recycle stream is returned preferably into the lower part of the reactor in order to assist in the agitation and homogenization of the reaction medium. By employing this cycle, the heat of the reaction is transferred without the necessity of expensive heat-transfer equipment or a separate medium while the isoenthalpic expansion produces the required frigorific units for keeping the reactor at the predetermined low temperature.

The process of this invention is applicable to the copolymerization of the higher alpha-olefins with ethylene at low temperatures. By conducting the reaction while the liquid reactants are in the boiling state, the reaction system becomes bivariant; therefore, when the temperature and pressure are held constant the composition is correspondingly fixed. In addition, the cycle according to the present invention facilitates the removal of an enormous quantity of heat at any temperature level and in particular at very low temperatures, i.e. from $+20°$ C. to $-100°$ C., without requiring large heat-exchanger surfaces and/or separate refrigerants. This heat-exchange cycle permits the effective use of high-polymerization reaction rates and investment-wise, permits a substantial savings in the number, size and cost of reactors. More important the present invention also provides exact control of the monomers in the liquid phase, and, by the use of the isoenthalpic expansion of the monomers, provides for the desired frigorific units without resorting to an outer frigorific cycle.

In the control of the copolymerization reactions, the parameters which must be regulated during the course of the reaction include the temperature, the pressure and the concentration of the monomer or monomers in the reactor. The concentration of the polymerizate in the reactor, however, is not significant in controlling the reaction. Thus, for example, in the copolymerization of ethylene ($C_2$.) with propylene ($C_3$.) in the liquid phase as disclosed in the Italian patent application, filed on Dec. 11, 1957, protocol No. 6,955 (Italian Patent No. 581,418); the reaction was conducted by mixing the two liquid monomers, thereby yielding a suspension of solid copolymer, which is in fact insoluble in the liquid monomers. This copolymer has a negligible vapor pressure and would not decompose into its monomers, and therefore, for purposes of reaction control, was considered as having left the system. In view of this, it has now been found that by separately and independently maintaining the pressure and temperature of the liquid phase constant and by keeping at the same time the liquid phase boiling, the ratio of monomers in the liquid phase is automatically fixed.

A specific embodiment of this invention is presented in FIGURE 1, wherein the temperature, pressure and olefin-monomer concentrations are precisely controlled. In reactor 1, the heat of polymerization is removed at temperature $T_1$ under pressure $P_1$, as latent heat of vaporization of liquid monomers. $X_1$ (ethylene) and $X_2$ (propylene) represent mol fractions or percentages in the liquid reaction phase and $Y_1$ (ethylene) and $Y_2$ (propylene) likewise represent molar concentrations of monomers in the vapor phase. Because of the higher volatility of ethylene, as compared to propylene, $Y_1$ is greater than $X_1$ and $Y_2$ is less than $X_2$.

The vapors from the reactor are heated in heat-exchanger 6 (which also acts as a superheater) to prevent any back-condensation (i.e. retrograde condensation), then compressed in compressor 8 to pressure $P_2$ at the temperature $T_2$, and then liquefied in condenser 9 to remove the heat obtained from different sources such as the heat from the feed streams of the propylene and ethylene, the heat of solubilization of ethylene, the heat of reaction, the heat of compression, the heat transferred from the surroundings, the heat developed by friction or agitation,etc. By condensation, $Y_1$ and $Y_2$ are changed into liquids $X_3$ and $X_4$ respectively, and these liquids are further cooled by being sent through the liquid side of the heat-exchanger 6 wherein the cool reactant gases cool the condensed liquids. The cooled liquids are then sent through the isoenthalpic pressure-reducing valve 10 where their pressure is reduced to a value practically the same as that prevailing in the reactor and recycled into the reactor.

The monomers are fed through inlets 2 (ethylene in the gaseous phase) and 4 (propylene in the liquid phase), and the catalysts of the type specified in the aforementioned patent application are fed through inlet 3. The suspension of solid copolymer is withdrawn from outlet 5 and any inert gas is purged from outlet 7. The copolymer can be also discharged from the bottom of the reactor 1, particularly when operating in a semi-continuous manner, i.e. when one or more reactants are introduced continuously but the product is discharged batchwise. The pressure in the reactor is regulated by varying the operating rate of compressor 8 by means of the pressure-responsive device PC which controls the means regulating the flow of operating energy into the compressor. The reaction temperature is regulated precisely by the flowrate of ethylene in line 2. This regulation of flow overcomes any fluctuation caused by the recycle temperature and rate. This is accomplished by means of device TC on valve II. The recycle rate is controlled by valve 10 operated by the liquid level of 6, held constant by the level control LC. Although this is the preferred method, it is obvious that other possible systems for controlling temperature and pressure may also be used. For example, PC could electrically, pneumatically or hydraulically control a valve on the low pressure suction side of the compressor.

It is important to note that the reactivity of the monomers is such that, e.g., in order to obtain at $-50°$ C. a copolymer consisting of 50% by mols of propylene and 50% ethylene, the concentrations in the reaction phase must amount to 95% by mols propylene and 5% by mols ethylene. It is therefore evident that as the copolymer is produced, the monomer concentrations would tend to change during the reaction, thereby yielding copolymers having a non-homogeneous composition. In accordance with this invention, however, the monomer concentrations are kept constant and as stated above. Control of the monomer concentrations is accomplished by regulating the pressure and temperature of the boiling-liquid reactants. The fact that the monomers are constantly being mixed by being at the boiling temperature, ensures a homogeneous concentration throughout the liquid phase; said concentration being independent of the quantity or rate of copolymer produced.

It is of interest to note that ethylene, for practical purposes, can be fed into the reactor in the gaseous phase without affecting the balance of the system. This can be readily discerned, as for each kg. of monomers reacted about 10 kg. of condensed vapor (e.g. 35% ethylene and 65% propylene) must be recycled. Thus, since ethylene exists prevailingly in the liquid state in the reaction zone, the diffusion of gaseous ethylene into the liquid reaction zone is of no practical significance from the rate of reaction standpoint.

To further illustrate the invention, the following examples are presented, but are not intended as a limitation. In the examples, the quantity "$T_0$" refers to the temperature at which the non-vulcanized elastomer exhibits the lowest elastic yield. This temperature is indicative of the fundamental properties of the polymer and furthermore is correlated with the molar composition of the copolymer as graphically presented in FIGURE 2. Thus, the mole composition of the polymer determines the area in which the elastomers can be used.

EXAMPLE I

An ethylene-propylene copolymer, having a homogeneous molar composition of 50% $C_2$. and 50% $C_3$., was obtained in the presence of a suitable catalyst, as described in the Italian patent application, filed in Milan on Dec. 11, 1957, protocol No. 6955 (Italian Patent No. 581,418) by operating at $-50°$ C. The composition of the reaction liquid phase was held constant at a molar ratio of 95 mols of propylene to 5 mols of ethylene. This ratio is very critical since minor variations result in a non-homogeneous product having unpredictable properties. The reaction was carried out by a process similar to that shown in FIGURE 1, where $X_1$ is 0.95 (propylene) and $X_2$ is 0.05 (ethylene).

The equilibrium pressure of this solution at $-50°$ C., was 0.35 atm. The heat of reaction of the polymerization amounted to about 600 cal./kg. In a continuous operation, in accordance with the above-described process, $T_2$ would equal 25° C.; $P_2$ would equal 27 atm.; $X_3$ (ethylene) would be 0.35, and $X_4$ (propylene) would be 0.65. Condensation of the vapors was carried out in a spray heat-exchanger.

In order to maintain the isothermal condition of the reaction vessel, it was necessary to compress the reaction gases from 0.35 to 27 atm. and to recycle about 2.5 kg. of $C_2$ and 7 kg. of $C_{3-}$ for each kg. of polymer produced. As a matter of fact, the recycle amounts were about 30% higher than the theoretical amounts, but this can be attributed to a substantial heat-transfer loss due to the relatively high surface to volume ratio of the small pilot apparatus.

The results obtained always agreed with the theoretical calculation, and the compositions in the liquid and in the gaseous phase were found to be absolutely constant during the continuous run of the system.

The complete data includes:

Reaction temperature——50° C.
Reaction pressure—0.35 atm.
Corresponding molar composition—95% of $C_{3-}$, 5% of $C_2$.
Concentration of the catalyst $VCl_{4+}$ triisobutyl aluminum—0.5 g./l.
Molar ratio: triisobutyl aluminum/$VCl_4$—4 (by mole)
$C_{3-}$ feed—4 kg./hour
Recycle—10 kg./hour
Molar composition of the recycle——65% of $C_{3-}$, 35% of $C_2$.
Temperature of the condenser—25° C.
Pressure after the compressor—27 atm.

The copolymer had the following characteristics:

$T_0$——31° C.
Molecular weight—500,000

This copolymer, vulcanized with peroxides, exhibited the following characteristics:

Tensile strength—210 kg./cm.$^2$
Elongation at break—410%
Modulus at 100% elongation—23 kg./cm.$^2$

EXAMPLE II

Copolymer obtained as in Example I with:

Reaction temperature——28° C.
Reaction pressure—2 atm.
Corresponding molar composition—96% of $C_{3-}$, 4% of $C_2$.
Concentration of the catalyst $VCl_{4+}$ triisobutyl aluminum—0.25 g./l.
Molar ratio: triisobutyl aluminum/$VCl_4$—4.9 (by mole)
$C_{3-}$ feed—3.5 kg./h.
Recycle—6.5 kg./h.
Molar composition of the recycle—78% of $C_{3-}$ 22% of $C_2$.
Temperature of the condenser—25° C.
Pressure after the compressor—20 atm.

The polymer obtained had the following characteristics:

$T_0$——18° C.
Ethylene content—39%
Molecular weight—450,000

This copolymer, vulcanized with peroxides, exhibited the following characteristics:

Tensile strength—216 kg./cm.$^2$
Elongation at break—480%
Modulus at 100% elongation—19 kg./cm.$^2$

EXAMPLE III

Copolymer obtained as in Example I, with:

Reaction temperature——29° C.
Pressure—2.1 atm.
Corresponding molar composition—95% of $C_{3-}$, 5% of $C_2$.
Concentration of the catalyst $VCl_{4+}$ triisobutyl aluminum—0.25 g./l.
Molar ratio: triisobutyl aluminum/$VCl_4$—4.9 (by mole)
$C_{3-}$ feed—3.5 kg./h.
Recycle—8.5 kg./h.
Molar composition of the recycle—74% of $C_{3-}$, 26% of $C_2$.
Temperature of the condenser—25° C.
Pressure after the compressor—22.5 atm.

The copolymer obtained had the following characteristics:

$T_0$——25° C.
Ethylene content—46%
Molecular weight—700,000

This copolymer, vulcanized with peroxides, presented the following characteristics:

Tensile strength—200 kg./cm.$^2$
Elongation at break—430%
Modulus at 100% elongation—20 kg./cm.$^2$ Examples II and III clearly show that minor variations in the concentration of reactants, other conditions being equal, result in copolymers having substantially different properties and compositions. These properties are also carried over to the vulcanized products, resulting in polymers useful in divergent fields.

The coplymer having the lowest temperature of elastic yield equal to $-19°$ C. has, in fact, a final ethylene content of 39% while the copolymer with $T_0 = -18°$ C. has an ethylene content of 46%.

The copolymer having $T_0 = -18°$ C. is obtained from a reaction composition comprising 96% propylene and 4% ethylene, but by changing this composition only slightly, to 95% propylene and 5% ethylene, a copolymer with $T_0 = -25°$ C. is obtained. Not only does the $T_0$ change radically, but at the same time the molecular weight also varies from 450,000 (Example II) to 700,000 (Example III).

It appears therefore that, in order to obtain a copolymer having a controlled composition, the concentration of the reactants must be kept constant. Without a punctilious control of reactant concentrations, a non-homogeneous mixture of copolymers, having a different composition, is obtained. Accordingly, this invention provides a simple, precise and inexpensive method for controlling the reactant composition.

It is obvious that a minor variation can be made in the scheme shown by FIGURE 1. For example, it is within the scope of this invention that in a particular case, the mechanical compression of the vapors can be incomplete and that the condensation can be carried out at lower temperature. In other instances, where there is no danger of back-condensation, the use of the superheater 6 can be avoided. With respect to the control apparatus, various modifications may be made, i.e. the pressure control can be replaced by the temperature control system, the device PC thus replacing the device TC. It is further evident that other variations and modifications may be possible and within the scope of the present invention.

What is claimed is:

1. In the copolymerization of ethylene and a higher alpha-olefin under constant temperature and pressure conditions, in the absence of an inert polymerization solvent, and while continuously feeding at least the ethylene into a reaction zone containing a liquid phase which is in equilibrium with a gaseous phase essentially consisting of ethylene and the higher alpha-olefin, the method for removing the reaction heat during the copolymerization and simultaneously controlling the composition of the copolymer produced at a predetermined, constant value which method comprises the steps of (1) continuously sucking said gaseous phase from the reaction zone, at a rate selected to maintain the pressure in said zone constant;
(2) compressing and liquifying said gaseous phase;
(3) cooling and isoenthalpically expanding the liquified gases to the pressure existing in the reaction zone;
(4) recycling the liquified gases to the copolymerization reaction zone; and
(5) feeding at least the ethylene into the reaction zone at a rate selected to maintain the temperature in said zone constant.

2. The method of claim 1, in which, in step (2) the said gaseous phase is heated, compressed and liquified.

References Cited

UNITED STATES PATENTS

| 2,484,384 | 10/1949 | Levine | 260—93.7 |
| 3,002,961 | 10/1961 | Kirschner | 260—93.7 |
| 3,078,261 | 2/1963 | Wisseroth | 260—92.1 |

FOREIGN PATENTS

| 553,655 | 6/1957 | Belgium. |
| 1,013,870 | 8/1957 | Germany. |

JOSEPH L. SCHOFER, Primary Examiner

R. S. BENJAMIN, Assistant Examiner